(12) United States Patent
Cho et al.

(10) Patent No.: US 9,850,115 B2
(45) Date of Patent: Dec. 26, 2017

(54) ADAPTOR FOR A LIFT JACK

(71) Applicants: Alex Cho, Chantilly, VA (US); Young Han Cho, Ashburn, VA (US)

(72) Inventors: Alex Cho, Chantilly, VA (US); Young Han Cho, Ashburn, VA (US)

(*) Notice: Subject to any disclaimer, the term of this patent is extended or adjusted under 35 U.S.C. 154(b) by 0 days.

(21) Appl. No.: 14/996,970

(22) Filed: Jan. 15, 2016

(65) Prior Publication Data

US 2016/0207748 A1    Jul. 21, 2016

Related U.S. Application Data

(60) Provisional application No. 62/105,531, filed on Jan. 20, 2015.

(51) Int. Cl.
*B66F 13/00* (2006.01)
*B60S 11/00* (2006.01)
*B60P 3/12* (2006.01)

(52) U.S. Cl.
CPC ............ *B66F 13/00* (2013.01); *B60P 3/125* (2013.01); *B60S 11/00* (2013.01)

(58) Field of Classification Search
CPC .......... B60P 3/125; B60S 11/00; B66F 13/00; Y10T 16/5275
See application file for complete search history.

(56) References Cited

U.S. PATENT DOCUMENTS

| | | | | |
|---|---|---|---|---|
| 2,153,722 A | * | 4/1939 | Loughmiller | B60S 9/06 254/420 |
| 2,491,143 A | * | 12/1949 | Weiss | B60D 1/04 24/599.7 |
| 2,544,039 A | * | 3/1951 | Pearne | B66F 3/38 254/134 |
| 2,548,944 A | * | 4/1951 | Chapman | B60S 11/00 254/133 R |
| 2,867,410 A | * | 1/1959 | Southerwick | B66F 3/38 24/698.1 |
| 3,415,490 A | * | 12/1968 | Steele | B60S 9/08 254/100 |
| 3,580,543 A | * | 5/1971 | Hafeli | B66F 13/00 254/100 |
| 3,758,077 A | * | 9/1973 | Fisher | B66F 13/00 254/133 R |
| 4,629,163 A | * | 12/1986 | Miller | B66F 13/00 254/100 |
| 6,612,615 B1 | * | 9/2003 | Dimand | B60R 9/06 224/531 |

(Continued)

FOREIGN PATENT DOCUMENTS

| | | | | |
|---|---|---|---|---|
| GB | 2008066 A | * | 5/1979 | ............... B60S 11/00 |
| GB | 2325917 A | * | 12/1998 | ................ B66F 1/06 |

*Primary Examiner* — Larry E Waggle, Jr.
*Assistant Examiner* — Tyrone V Hall, Jr.
(74) *Attorney, Agent, or Firm* — Mannava & Kang, P.C.

(57) ABSTRACT

In an example, an adaptor for a lift jack may include a first section having an opening to receive a ring attached to a vehicle and a second section connected to the first section, in which the second section includes a space to receive a runner support of a lift jack runner. The adaptor may also include a locking hook rotatably connected to the second section, in which the locking hook is to latch onto the ring when the runner support is inserted into the space in the second section.

16 Claims, 5 Drawing Sheets

(56) References Cited

U.S. PATENT DOCUMENTS

| | | | | |
|---|---|---|---|---|
| 7,264,261 B2* | 9/2007 | Konsela | ................... | B60D 1/02 |
| | | | | 280/416.1 |
| 7,370,844 B2* | 5/2008 | McGriff | ................... | B60D 1/07 |
| | | | | 254/418 |
| 7,416,215 B1* | 8/2008 | Rosario | ................... | B60S 9/08 |
| | | | | 254/424 |
| 8,162,290 B1* | 4/2012 | Tracy | ....................... | B66F 1/06 |
| | | | | 254/133 R |
| 2005/0056818 A1* | 3/2005 | Harrah | .................... | B66F 3/25 |
| | | | | 254/133 R |
| 2006/0237700 A1* | 10/2006 | Thomas | .................. | B60S 11/00 |
| | | | | 254/133 R |
| 2008/0191183 A1* | 8/2008 | Rucks | ...................... | B66F 3/08 |
| | | | | 254/424 |
| 2011/0253954 A1* | 10/2011 | Fortner | .................... | B66F 3/10 |
| | | | | 254/98 |
| 2013/0099086 A1* | 4/2013 | Jevne | ...................... | B60S 11/00 |
| | | | | 248/511 |

* cited by examiner

```
┌─────────────────────────────────────┐
│   POSITION AN ADAPTOR ON A TOW RING │
│                 402                 │
└─────────────────────────────────────┘
                  │
                  ▼
┌─────────────────────────────────────┐
│ INSERT RUNNER SUPPORT OF A JACK LIFT INTO THE │
│ ADAPTOR, WHICH CAUSES A LATCHING MECHANISM │
│        TO LATCH ONTO THE TOW RING   │
│                 404                 │
└─────────────────────────────────────┘
```

*FIG. 4*

ADAPTOR FOR A LIFT JACK

CROSS-REFERENCE TO RELATED APPLICATION

This application claims priority to provisional U.S. Application Ser. No. 62/105,531, filed on Jan. 20, 2015, and entitled "ADAPTOR FOR A LIFT JACK," the disclosure of which is hereby incorporated by reference in its entirety.

BACKGROUND

Lift jacks are typically used to lift vehicles when it becomes necessary to change tires or to make minor repairs to the wheels of the vehicles. Lift jacks are available in many different sizes and configurations to enable vehicles to be lifted at different locations on the vehicles. For instance, certain types of lift jacks are suited for lifting vehicles along the frames of the vehicles, while others are suited for lifting vehicles along their bumpers.

BRIEF DESCRIPTION OF THE DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Disclosed herein is an adaptor for a lift jack. The adaptor is to be latched onto a tow ring of a vehicle to enable the vehicle to be lifted via the tow ring with a lift jack. Particularly, the adaptor is to be automatically latched to the tow ring through insertion of a runner support of the lift jack into the adaptor and to be automatically unlatched from the tow ring when the runner support of the lift jack is removed from the adaptor. In one regard, therefore, the adaptor disclosed herein enables vehicles to be lifted through use of a lift jack in a safe and relatively easy manner.

Figure 1:
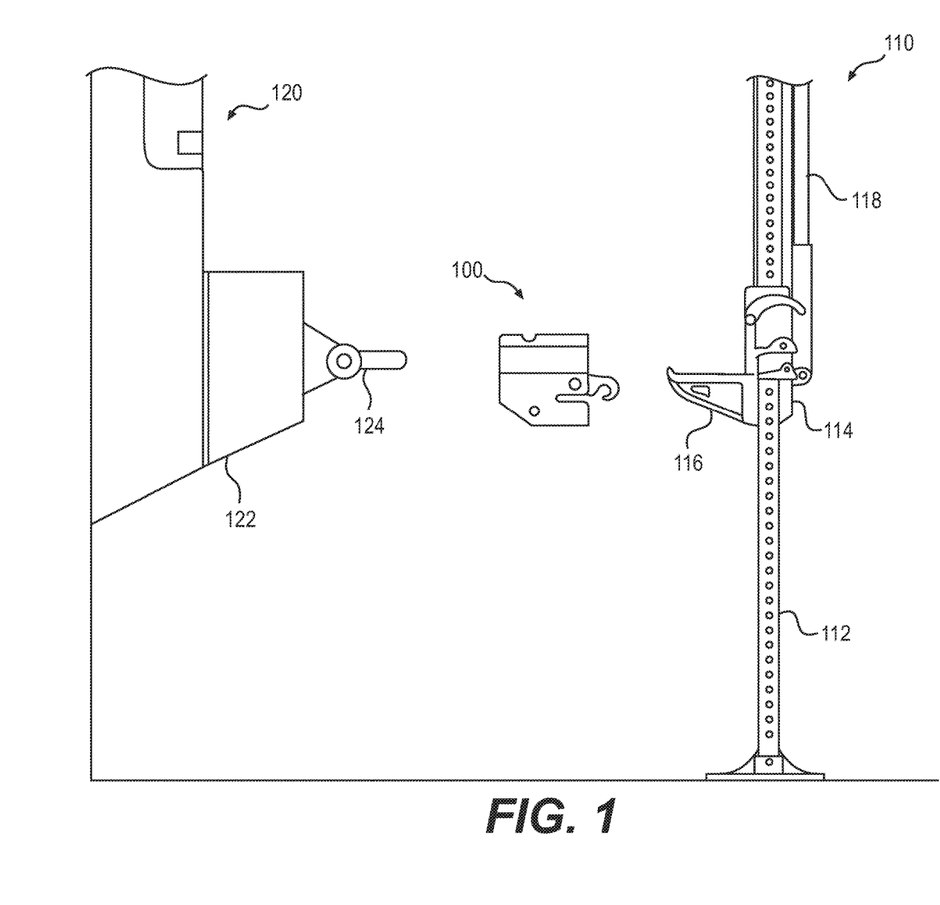
FIG. 1 shows a view of an adaptor, a lift jack, and a vehicle, according to an example of the present disclosure.

With reference first to FIG. 1, there is shown a simplified view of an adaptor 100, a lift jack 110, and a portion of a vehicle 120, according to an example. It should be understood that the elements depicted in FIG. 1 may include additional components and that elements may not be drawn to scale and thus, the elements may have different sizes and/or configurations other than as shown therein.

As shown in FIG. 1, the lift jack 110 may include a bar 112, a runner 114 having a runner support 116, and a handle 118. In addition, the vehicle 120 may include a bumper 122 and a ring 124, which is also referred to herein as a tow ring 124, connected to the bumper 122. The ring 124 may be rigidly connected to the bumper 122 and the bumper 122 may be attached to a frame (not shown) of the vehicle 120. Particularly, the ring 124, which may be a "D"-ring or an "O"-ring, may have a sufficient strength and may be connected to the bumper 122 with a sufficiently strong connection to enable, for instance, at least a portion of the weight of the vehicle 120 to be supported by the ring 124 without the ring 124 breaking or detaching from the bumper 122. Likewise, the bumper 122 may be formed of a material having sufficient strength and may be attached to the vehicle 120 frame with a sufficiently strong attachment to enable, for instance, at least a portion of the weight of the vehicle 120 to be supported by the bumper 122 without the bumper 122 breaking or detaching from the vehicle 120 frame. Particularly, for instance, the bumper 122 and the ring 124 may be of sufficient strength to enable a portion of the vehicle 120 to be lifted a sufficient distance to enable a tire of the vehicle 120 to be removed.

The lift jack 110 may be suited for lifting vehicles that have relatively large ground clearances, such as all-terrain vehicles, four-wheel drive vehicles, Jeep™ vehicles, etc. In other words, the bar 112 may be relatively tall to accommodate the large ground clearances. In a normal operation, the lift jack 110 may be employed by placing the runner support 116 underneath a frame of a vehicle 120 and manipulating the handle 118 to cause the runner 114 to be jacked up the bar 112 and thus lift the vehicle 120.

According to an example, the adaptor 100 is to receive the ring 124 through one side of the adaptor 100 and to receive the runner support 116 through an opposite side of the adaptor 100. The adaptor 100 may thus function to mate the runner support 116 to the ring 124 and to enable the ring 124 to be raised with the runner support 116. In this regard, the adaptor 100 may enable at least a portion of the vehicle 120 to be lifted by lifting of the ring 124 using the lift jack 110. Lifting of the vehicle 120 in this manner may be relatively simpler than lifting of the vehicle 120 following positioning of the runner support 116 underneath a portion of the vehicle 120 frame. For instance, placement of the runner support 116 underneath a portion of the vehicle 120, such as on a frame or a frame-mounted tubular or flat skid rail, typically requires that a user find an appropriate location on the frame or frame-mounted rail for the runner support 116 as well as to correctly place the runner support 116 underneath the frame or frame-mounted rail, which may be difficult and/or time consuming.

Figure 2A:
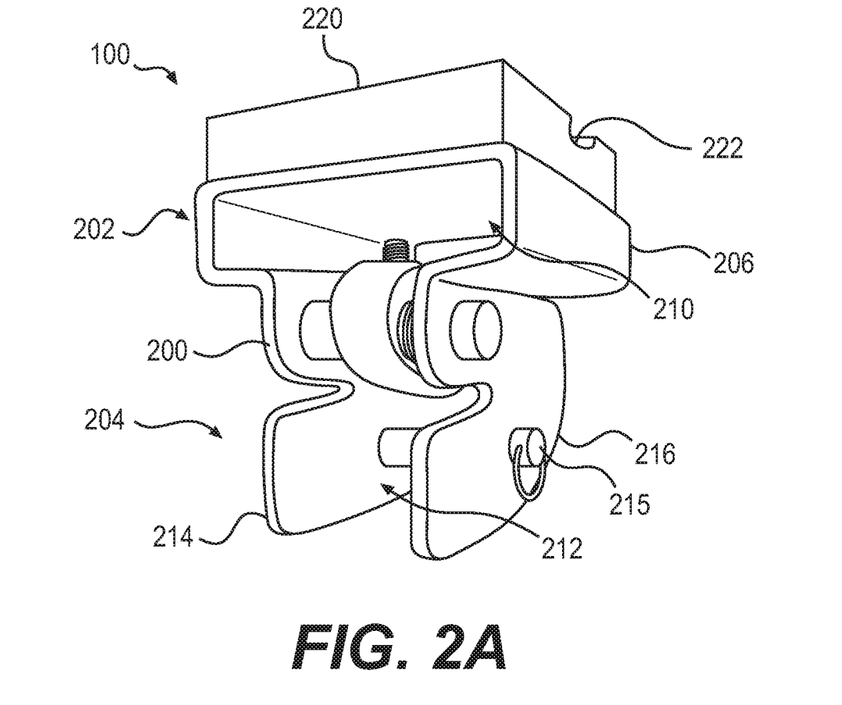
FIG. 2A shows a side perspective view of the adaptor depicted in FIG. 1, according to an example of the present disclosure.
Figure 2B:
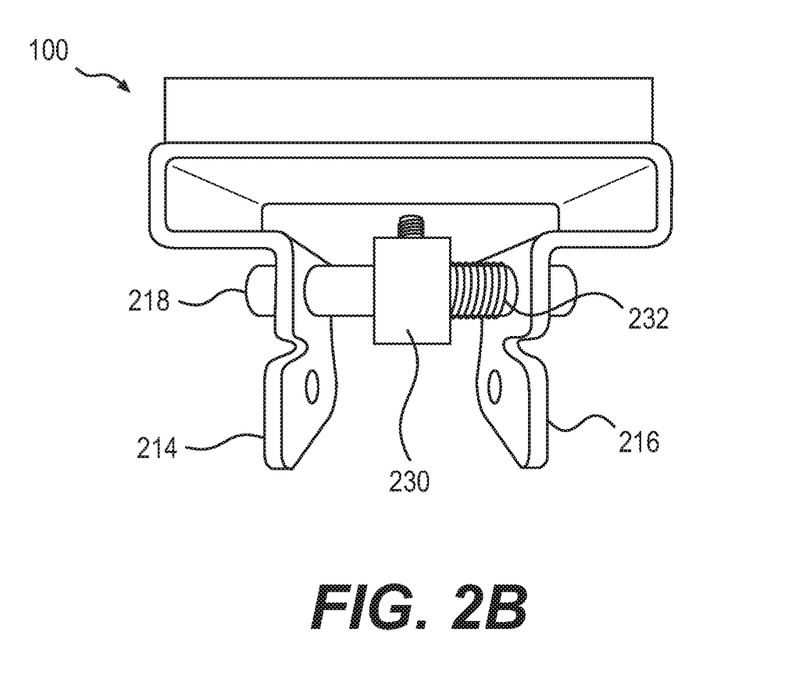
FIG. 2B shows a rear perspective view of the adaptor depicted in FIG. 1, according to an example of the present disclosure.
Figure 2C:
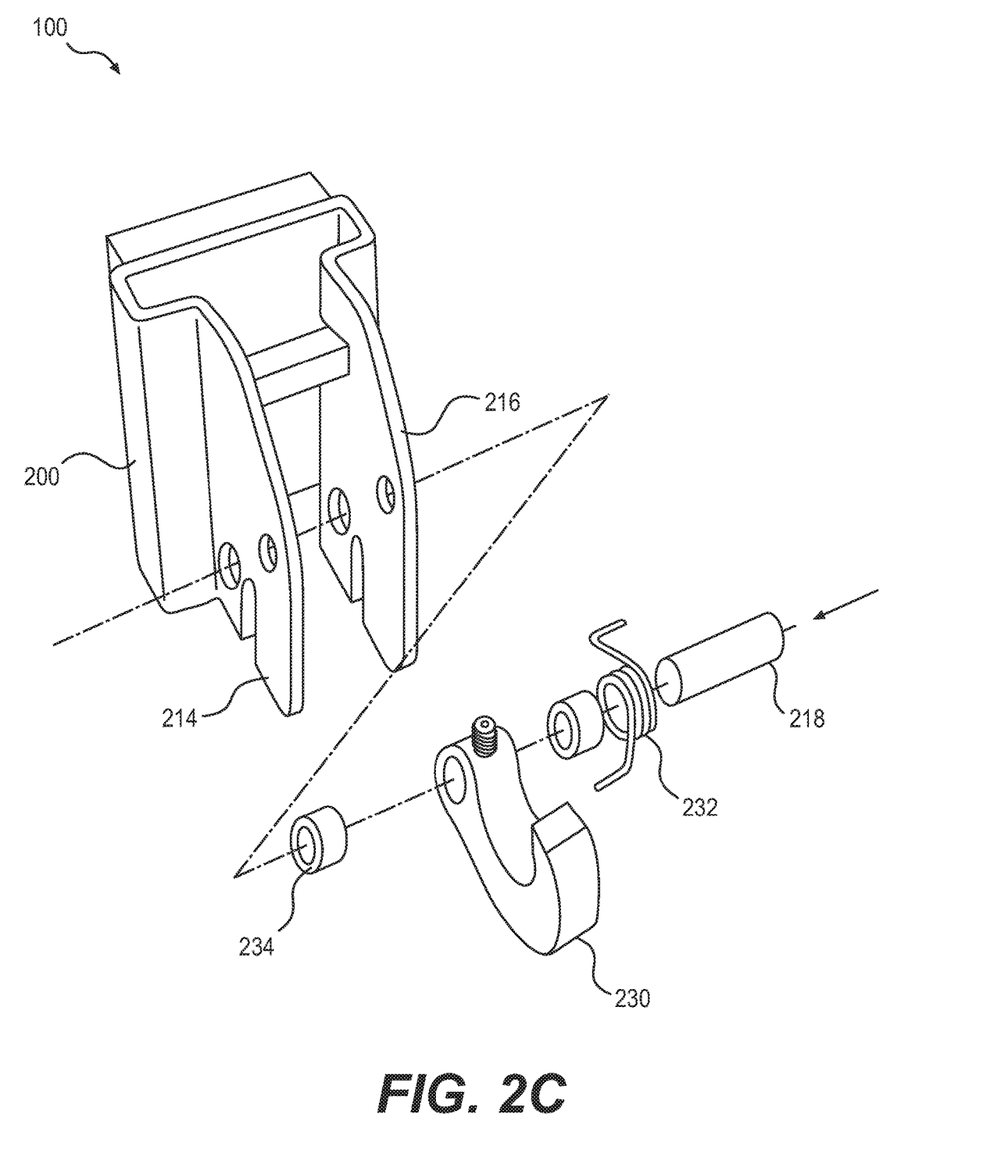
FIG. 2C shows an exploded view of the adaptor depicted in FIG. 1, according to an example of the present disclosure.

Turning now to FIGS. 2A-2C, there are respectively shown a side perspective view, a rear perspective view, and an exploded view of the adaptor 100, according to an example. It should be understood that the adaptor 100 depicted in FIGS. 2A-2C may include additional elements and that some of the elements depicted therein may be removed and/or modified without departing from a scope of the adaptor 100.

The adaptor 100 is depicted as including a body 200 having a first section 202 and a second section 204. The first section 202 includes a structure 206 that has a generally rectangular shape and includes an opening 210 to receive a ring 124, which may be a D-ring, shackles, or the like, attached to a vehicle 120 (FIG. 1). The second section 204 extends from or is otherwise connected to the first section 202 and includes a space 212 to receive a runner support 116 of a lift jack 110 (FIG. 1). Particularly, the second section 204 is depicted as being formed of a pair of segments 214, 216 extending from the first section 202. In addition, the opening 210 in the first section 202 is depicted as having a relatively larger width as compared with the space 212 between the segments 214, 216.

According to an example, the body 200 is formed of a single sheet of material such as metal, metal alloy, plastic, composite materials, or the like. For instance, the body 200 may be formed by stamping or bending a sheet of metal to have a particular configuration and the stamped or bent sheet of material may be further bent into the shape of the body 200 shown in FIG. 2A. As another example, the body 200 may be formed through a molding process.

The adaptor 100 is also depicted as including a third section 220 positioned on top of the first section 202. The third section 220 may be attached to the first section 202 through any suitable fastening mechanism. For instance, the third section 220 may be attached to the first section 202 through use of an adhesive, mechanical fasteners, etc. In addition, the third section 220 may be formed of a material that differs from that of the body 200. For instance, the third section 220 may be formed of a plastic material, a composite material, a polymer material, etc. According to an example, the third section 220 is formed of a block of material that is not to damage a frame or frame-mounted rail of the vehicle 120.

The third section 220 is also depicted as including a groove 222 formed on the surface of the third section 220 opposite the surface that is in contact with the first section. According to an example, the third section 220 may provide a contact surface in instances in which the adaptor 100 is used in a manner different than the implementation depicted in FIG. 1. In this example, the adaptor 100 may be positioned underneath the vehicle 120, for instance, under a frame or frame-mounted rail of the vehicle 120. In addition, the frame of the vehicle 120 may be positioned in the groove 222 to provide a more stable contact between the adaptor 100 and the vehicle 120 frame.

Turning now to FIG. 2B, the adaptor 100 is depicted as including a pin 218 extending in the space 212 between the segments 214, 216. That is, the segments 214, 216 may have aligned holes through which the pin 218 extends. In addition, the pin 218 may extend through a locking hook 230, which is also referred to herein as a latching mechanism. The locking hook 230 and/or the pin 218 may be mounted in the adaptor 100 to enable the locking hook 230 to rotate between a locked position and an unlocked position. The unlocked position, which is the position of the locking hook 230 depicted in FIGS. 2A and 2B, is a position in which a hook portion of the locking hook 230 is outside of the opening 210 in the first section 202. The locked position is a position in which the hook portion of the locking hook 230 extends into the opening 210 in the first section 202. Particularly, and as described in greater detail below, the locked position is a position in which the hook portion of the locking hook 230 latches onto the ring 124. As also discussed in greater detail herein, the locking hook 230 may be rotated into the locked position as the runner support 116 is inserted into the space 212.

As also shown in FIG. 2B, a tension spring 232 is positioned along the pin 218. The tension spring 232 is to bias the locking hook 230 into the unlocked position when the runner support 116 is removed from the space 212. In this regard, the locking hook 230 may automatically be latched onto the ring 124 as the runner support 116 is inserted into the space 212 and automatically unlatched from the ring 124 as the runner support 116 is removed from the space 212. Although the tension spring 232 is depicted as being position between segments 214, 216, it should be clearly understood that the tension spring 232 may be positioned outside of the second section, within the pin, or the like, without departing from a scope of the adaptor 100.

As shown in FIG. 2C, the pin 218 may extend through the tension spring 232 and a hole in the locking hook 230. The pin 218 may also extend through a pair of spacers 234 that may be sized to hold the locking hook 230 in a desired position with respect to the segments 214 and 216. For instance, the spacers 234 may hold the locking hook 230 at a substantially central location between the segments 214 and 216. The pin 218 may further be inserted through aligned holes in the segments 214 and 216 and may be held with respect to the segments 214 and 216 by addition hardware, such as cotter pins, or other hardware fasteners.

Figure 3A:
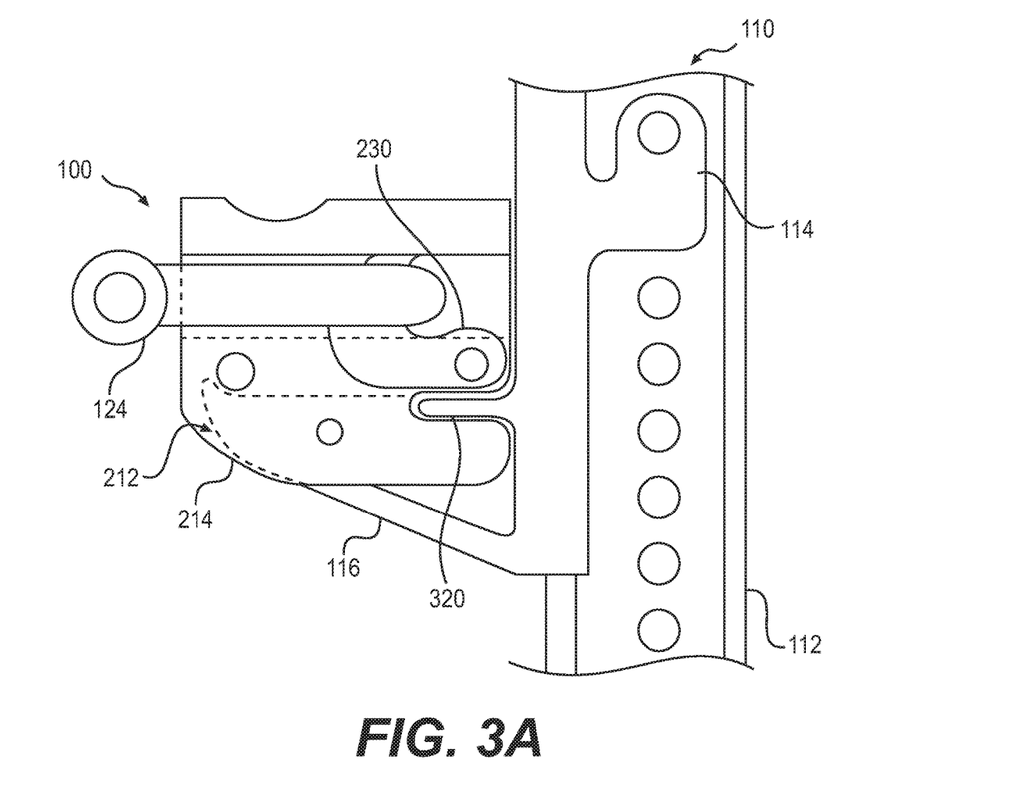
FIG. 3A shows a side view, partially in cross-section, of the locking hook of the adaptor in the locked position with respect to the ring when the runner support is inserted into the space, according to an example.
Figure 3B:
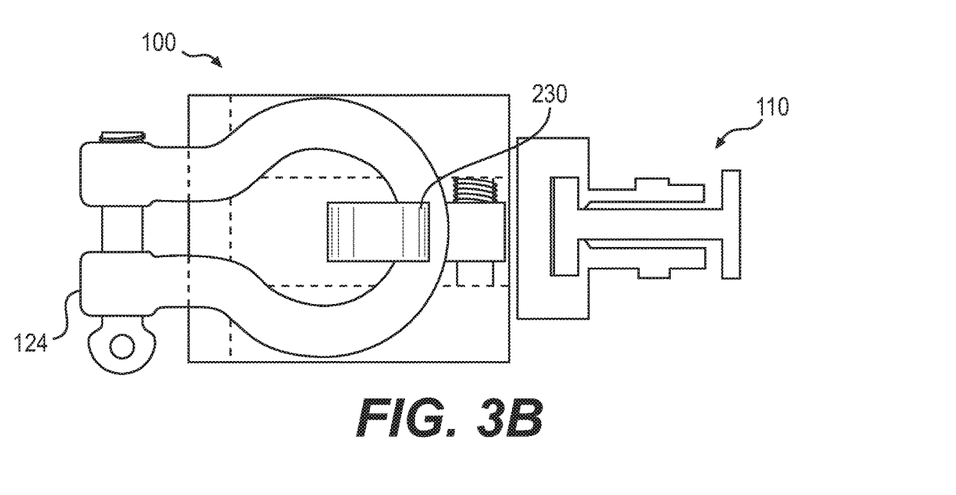
FIG. 3B shows a top view, partially in cross-section, of the locking hook of the adaptor in the locked position with respect to the ring when the runner support is inserted into the space, according to an example.

With reference now to FIGS. 3A and 3B, there are respectively shown a side view and a top view, partially in cross-section, of the adaptor 100, lift jack 110, and ring 124, according to an example. Particularly, FIGS. 3A and 3B show the locking hook 230 of the adaptor 100 in the locked position with respect to the ring 124 when the runner support 116 is inserted into the space 212. For instance, as shown in FIG. 1, the locking hook 230 may be shaped and positioned in the adaptor 100 such that insertion of the runner support 116 causes the locking hook 230 to rotate around the pin 218 and engage the ring 124. In this regard, the adaptor 100 may automatically be securely latched onto the ring 124 as the runner support 116 is inserted into the adaptor 100.

As also shown in FIG. 3A, notches 320 may be provided on the segments 214, 216 to accommodate features of the runner support 116. In this regard, the segments 214, 216 may be formed to include any number of variously configured elements to accommodate features of various types of runner supports 116.

Figure 4:
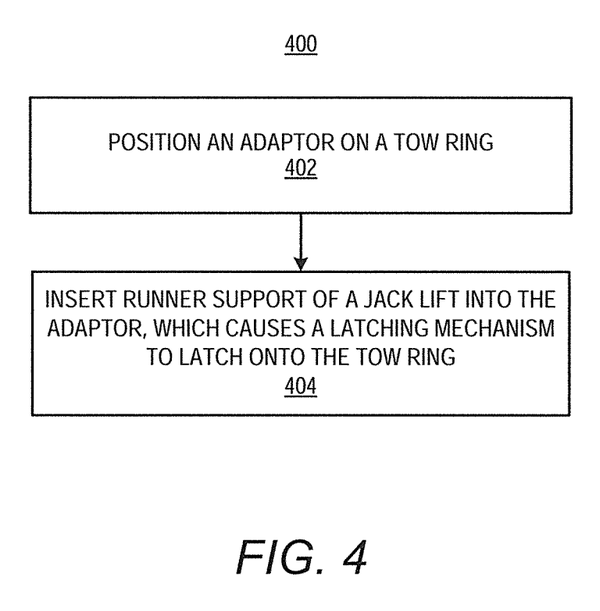
FIG. 4 shows a flow diagram of a method for implementing a lift jack adaptor, according to an example of the present disclosure.

Turning now to FIG. 4, there is shown a flow diagram of a method 400 for implementing an adaptor to lift a vehicle, according to an example. It should be apparent to those of ordinary skill in the art that the method 400 may represent generalized illustrations and that other operations may be added or existing operations may be removed, modified, or rearranged without departing from the scope of the method 400.

The description of the method 400 is made with reference to the adaptor 100 illustrated in FIGS. 1-3B for purposes of illustration. It should, however, be clearly understood that apparatuses having other configurations may be implemented to perform the method 400 without departing from the scope of the method 400.

At block 402, an adaptor 100 may be positioned on a tow ring 124 of a vehicle 120 to cause the tow ring 124 to be inserted into an opening 210 in the first section 202 of the adaptor 100.

At block 404, a runner support 116 of a lift jack 110 may be inserted into the second section 204 of the adaptor 100. The second section 204 may include a pair of segments 214, 216 that are spaced apart from each other and includes features, e.g., notches 320, to securely contact the runner support 116. In addition, a latching mechanism 230, which is rotatably attached to the pair of segments 214, 216, may be rotated from a first position, e.g., unlocked position, to a section position, e.g., locked position, as the runner support 116 is inserted into the space 212 between the pair of segments 214, 216. As shown in FIGS. 3A and 3B, the locked position is a position in which the latching mechanism 230 latches onto the tow ring 124.

Particularly, the latching mechanism 230 may automatically be rotated as the runner support 116 is inserted into the space 212. That is, as the runner support 116 is brought close to the latching mechanism 230, a leading surface of the runner support 116 may contact a leading surface of the latching mechanism 230. As the runner support 116 continues to be pushed through the space 212, the runner support 116 may apply sufficient force onto the latching mechanism 230 to cause the latching mechanism 230 to rotate about the pin 218 until the latching mechanism 230 latches onto the ring 124 as shown in FIGS. 3A and 3B.

The handle 118 of the lift jack 110 may be manipulated to jack up the runner 114 and thus the vehicle 120 via the ring 124.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An adaptor for a lift jack, said adaptor comprising:
a first section having an opening to receive a ring attached to a vehicle;
a second section connected to the first section, wherein the second section includes a space to receive a runner support of a lift jack runner and the second section has a smaller width as compared with a width of the first section;
a locking hook rotatably connected to the second section, wherein the locking hook is to move between an unlocked position and a locked position, and wherein the locking hook is to move to the locked position and latch onto the ring through contact with the runner support as the runner support is inserted into the space in the second section; and
a tension spring connected to the locking hook, wherein the tension spring is to bias the locking hook into the unlocked positioned.

2. The adaptor of claim 1, further comprising:
wherein the locking hook is to latch onto the ring as the runner support is inserted into the space in the second section; and
wherein the tension spring is to cause the locking hook to be unlatched from the ring as the runner support is removed from the space in the second section.

3. The adaptor of claim 1, wherein the second section comprises a pair of coextensive segments extending from the first section and wherein the locking hook is connected to a pin attached to the coextensive segments.

4. The adaptor of claim 3, wherein each of the coextensive segments includes a notch to receive a portion of the runner support.

5. The adaptor of claim 1, wherein the second section is integrally formed with the first section from a single sheet of material.

6. The adaptor of claim 1, further comprising:
a third section positioned above the first section, the third section having a surface for contact with a portion of a frame of the vehicle.

7. The adaptor of claim 1, wherein the ring that is to be inserted into the opening of the first section is a tow ring connected to a bumper of the vehicle and wherein the opening is sized to receive the tow ring.

8. An adaptor for a lift jack, said adaptor comprising:
a body having a first section and a second section, wherein the first section and the second section are formed of a single piece of material, wherein the first section has an opening, and wherein the second section includes two coextensive segments extending from the first section;
a pin extending between the coextensive segments of the second section;
a latching mechanism rotatably connected to the pin, wherein the latching mechanism includes a locking hook that is to rotate between a first position and a second position, wherein the first position is a position in which the locking hook is outside of the opening and the second position is a position in which the locking hook is within the opening; and
a spring connected to the latching mechanism, wherein the spring is biased to maintain the latching mechanism in the first position, wherein insertion of a runner support between the coextensive segments the runner support to contact the latching hook and cause the latching hook to rotate into the second position at which the latching hook is latched onto a tow ring of a vehicle and wherein the spring is to cause the latching hook to be unlatched from the tow ring when the runner support is removed from between the coextensive segments.

9. The adaptor of claim 8, wherein the first section has a first width and the second section has a second width, and wherein the first width is larger than the second width.

10. The adaptor of claim 8, wherein each of the coextensive segments includes a notch to receive a portion of the runner support.

11. The adaptor of claim 8, further comprising a third section, said third section having a relatively flat surface with a groove to contact a frame of the vehicle.

12. The adaptor of claim 11, wherein the third section comprises a solid piece of material formed of a material that differs from the first section and the second section.

13. The adaptor of claim 8, further comprising another pin connected to the coextensive segments of the second section.

14. The adaptor of claim 8, wherein the opening is sized to receive the tow ring attached to a bumper of the vehicle.

15. The adaptor of claim 8, wherein the coextensive segments of the second section are spaced a sufficient distance apart from each other to enable the runner support of the lift jack to be positioned between the coextensive segments.

16. A method of implementing a lift jack adaptor, said method comprising:
    providing a lift jack adaptor comprising: a first section having an opening;
    a second section connected to the first section, wherein the second section includes a space and the second section has a smaller width as compared with a width of the first section;
    a locking hook rotatably connected to the second section, wherein the locking hook is to move between an unlocked and a locked position; and
    a tension spring connected to the locking hook, wherein the tension spring is to bias the locking hook into the unlocked position;
    positioning the lift jack adaptor on a tow ring attached to a vehicle to cause the tow ring to be inserted into the opening in the first section; and
    inserting a runner support of a lift jack into the space of the second section of the adaptor, wherein the second section includes a pair of segments that are spaced apart from each other and includes features to securely contact the runner support, wherein the locking hook is rotatably attached to the pair of segments, and wherein insertion of the runner support causes the locking hook to rotate from the unlocked position to the locked position, wherein the locked position is a position in which the locking hook latches onto the tow ring.

\* \* \* \* \*